United States Patent Office 3,402,232
Patented Sept. 17, 1968

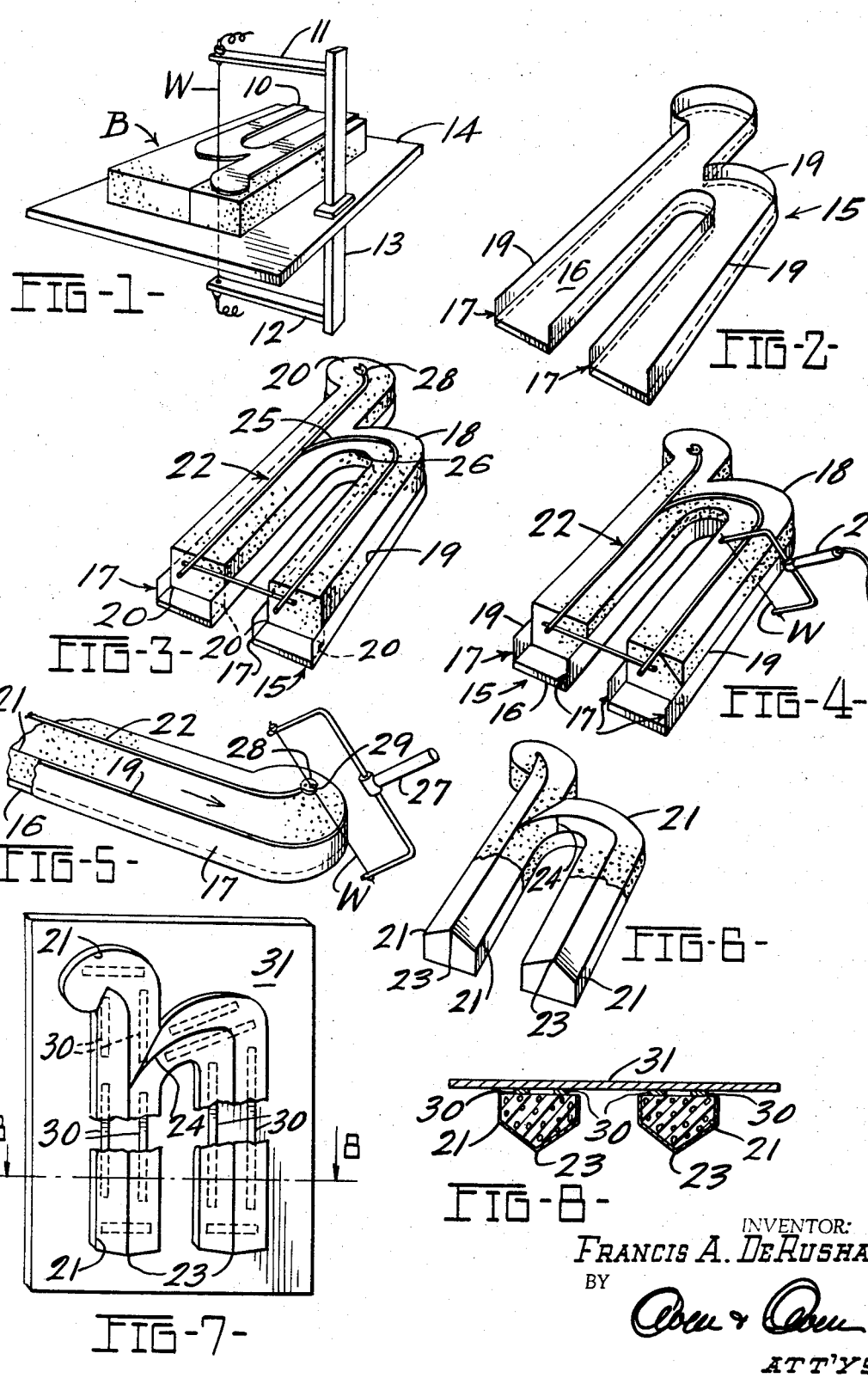

3,402,232
PREPARATION OF SHAPED OBJECTS OF THERMOPLASTIC MATERIALS
Francis A. De Rusha, Toledo, Ohio, assignor to International Assemblix Corporation, Toledo, Ohio, a corporation of Illinois
Filed Apr. 20, 1966, Ser. No. 543,977
4 Claims. (Cl. 264—129)

This invention relates to a method of forming complexly shaped, three dimensional objects of thermoplastic material which may be used for letters or other indicia in advertising displays, billboards or the like. More particularly, this invention relates to a method of fabricating from billets or blanks of a thermoplastic material, such as foamed polystyrene, complexly shaped, three dimensional figures for use in advertising displays, etc. by shaping and finishing the exposed surfaces thereof which are formed through use of shaped jigs and cutting guides which guide the forming tool and thus determine the shape of the object.

The use of three dimensional letters and other display indicia in billboard advertising and for point of sale displays has become prevalent, due to the fact that such three dimensional letters or figures are significantly more appealing and eye-catching than flat printed or hand drawn media. Particularly in the case of billboard advertising, three dimensional letters, when coupled with other printed indicia on an appropriately contrasting background, present a pleasing and eye-catching display. Heretofore, such three dimensional letters have been fabricated by hand, from wood or moldable compositions, such as plaster of Paris, etc.

Wooden letters or indicia of large size are quite heavy and require at least two persons to elevate and secure the large letters in place on a billboard. Molded ceramic letters are fragile, require considerable expense in making pre-formed molds, etc. for their preparation, cannot be removed from the billboard without breakage, and therefore cannot be used a second time.

In addition to their use for billboard advertising purposes, three dimensional objects of foamed thermoplastic materials fabricated with the method of this invention may also be used with illustrative models, etc. for point of sale advertising displays. Such letters and models, when made from wood or molded compositions, have the same disadvantages as previously enumerated in reference to billboard advertising letters.

Large size letters and models prepared from lightweight, thermoplastic materials, such as polystyrene, are advantageous in that, because of their light weight, they may be transported and hung by a single person preparing a billboard and furthermore, the means for attaching them to the face of the billboard may be greatly simplified because of their light weight. In addition, the raw material is relatively inexpensive compared to wood and, following the method of this invention, can be readily and easily prepared so that the end product simulates one of wood or molded ceramic compositions and has the advantages of lightness and economy of manufacture.

Accordingly, it is an object of this invention to provide a method of preparing complexly shaped, three dimensional objects of thermoplastic materials which may be used for billboard advertising or display purposes, which objects are light in weight, simulate the appearance of wooden or molded ceramic objects, and can be fabricated speedily and economically.

It is another object of this invention to provide a method of preparing complexly shaped, three dimensional objects for use in advertising purposes, which method enables the operator to produce one or a large number of identically shaped objects of thermoplastic material.

It is yet another object of this invention to provide a method of preparing complexly shaped, three dimensional objects of a thermoplastic material which includes the steps of forming an initial outline of such objects from a predetermined pattern from a billet or blank of said thermoplastic material, of forming at least one exposed face at an oblique to the side and top faces of the outlined form, and coating the exposed faces with a coating material which substantially fills and masks the surface irregularities in such faces to form a shaped, three dimensional object with all exposed faces having high gloss and uniform surface.

Other objects and advantages of this invention will be apparent to persons skilled in the art from the following detailed description of the method of this invention, reference being made to the accompanying drawings in which:

FIG. 1 illustrates the first step in forming the outline of a complexly shaped, three dimensional object from a rtctangular blank or billet of thermoplastic material, showing a cutting table and jig used for guiding a hot cutting wire along the outer edges of a cutting guide attached to the upper surface of the blank;

FIG. 2 is a view in perspective of a first, lower forming guide which is used to guide the cutting wire in forming the oblique faces on the outlined piece cut from the blank shown in FIG. 1, this cutting guide being in the form of a lower case letter *h*;

FIG. 3 shows the outlined piece formed from the blank shown in FIG. 1 placed in the first, lower forming guide of FIG. 2 with a second, upper forming guide attached to the upper surface of the outlined piece;

FIG. 4 schematically illustrates the manner in which the oblique faces are formed by guiding a hot wire cutter along the first and second forming guides as it passes through the outlined piece;

FIGURE 5 illustrates the manner in which the hot wire cutter is guided by the upper or second forming guide at a terminal portion thereof, as at the uppermost portion of the letter "*h*";

FIG. 6 illustrates the shaped object after the oblique faces have been formed as illustrated in FIGS. 4 and 5 and shows the partial application of a surface coating material;

FIG. 7 shows the final product as it would be mounted on a billboard or display background by use of adhesive or magnetic strips, and;

FIG. 8 is a view in cross section, taken along line 8—8 of FIG. 7 showing in detail the manner in which the letter may be adhered to a metallic signboard by the use of magnetic strips.

The method of this invention is useful in forming complexly shaped articles from a thermoplastic material of low density, such as foamed polystyrene. For use of these materials in billboard advertising or window displays, etc., it is desirable that the foamed thermoplastic be of a type, such as polystyrene, which is weather resistant and which is characterized by a relatively small cell size and the absence of large voids caused by use of a highly volatile blowing agent. Such foamed materials are readily available in a number of densities and sizes.

Generally, the method of this invention includes the steps of forming the silhouette or outline of a complexly shaped object, such as a letter for use in advertising purposes, by cutting, by means of a saw blade or heated wire, the outline of the letter from a rectangular blank by guiding the cutting blade or wire along the edges of a pre-formed sheet metal pattern affixed to the top of the blank. The outlined shape is next placed in a first, lower guide member which corresponds generally in outline to the outlined blank and has vertically extending guide members which are adjacent and parallel to the vertical faces of the cut blank. A second, upper guide member is then secured to the top of the cut blank to provide a second guide surface for a hand-manipulated cutting blade or wire. This cutting blade or wire is passed along, in contact with the first and second guide members, so that the exposed face formed thereby is determined by the relative position of the first and second guide to the outer surfaces of the outlined blank. When this forming process has been completed, the shaped letter is coated with an appropriate coating to smooth and fill any irregularities on the exposed surfaces and finally is painted an appropriate color and attached to the display board.

Referring first to FIG. 1, the silhouette or outline of the object to be formed, such a letter "h" in this illustration, is prepared by passing a heated wire W along the edges of a sheet metal guide 10 which has been affixed to the upper surface of a billet or blank b of thermoplastic material. As shown in this figure, the wire W is held by a pair of arms 11 and 12 supported by a vertical post 13 which extends through and is secured to a horizontal forming table 14. The sheet metal guide 10 may be pinned, tacked or otherwise secured to the upper surface of the blank B and the wire W is moved through the blank B by guiding the blank B and the sheet metal guide 10 over the surface of the table 14 as the wire passes along the edge of the sheet metal guide 10. In this illustration, the wire W is at right angles to the surface of the table 14 so that the edges of the outlined shape cut from the blank B are normal to the front and rear surfaces of the blank B, as seen in FIGS. 3 and 4.

Referring to FIG. 2, a shaped lower jig 15 having a bottom surface 16 and upwardly extending sides 17 is used as a first, lower guide for preparing the oblique faces of the letter "h". The jig 15 is so dimensioned such that the exposed area of the bottom surface 16 is identical to the shape of the outlined piece formed from the blank B so that this outlined piece, designated by reference numeral 18 in FIGS. 3 and 4, will snugly fit upon the bottom surface 16 of the jig 15 with the sides 17 extending adjacent and parallel to the sides of the piece 18. The sides 17 of the jig 15 may be fabricated from sheet metal which is secured to the edges of the bottom surface 15 by suitable adhesives and/or tacks or staples.

As best seen in FIG. 3, the upper edges 19 of the side 17 of the jig 15 are, in this illustration, spaced from and parallel to the lowermost corner, designated by reference numeral 20 formed by the intersection of the vertical sides and the lower surface of the outlined piece 18. As will be seen below, this upper edge 19 is used as a guide for the next operation so that the face formed thereby will have an edge, designated by reference numeral 21 in FIG. 6 which is spaced from and parallel to the lowermost corners 20 of the final letetr formed.

The second guide 22 is positioned upon the upper face of the silhouetted blank 18, as shown in FIG. 3, and secured by appropriate pins or staples.

In this illustration, the straight portions of the second guide 22 are parallel to and spaced from the vertical edges of the outlined piece 18 so that the subsequent forming operation will form an uppermost ridge, designated by reference numeral 23 of FIG. 6, which is parallel to a vertical side portion of the final letter formed.

It will be apparent that the position of the second guide 22 relative to the upper edge 19 of the side 17 of the jig 15 will determine the position or angle of the face formed by the subsequent forming operation which is illustrated in FIG. 4. In forming the letter "h" which is illustrated in FIG. 6, the uppermost ridge 23 lies halfway between the angled edges 21 of the straight portions or the legs of the letter. Consequently, the straight portions of the second guide 22 are positioned, as shown in FIG. 3, halfway between the vertical sides of the outlined piece 18. In the uppermost portion of the letter, where the shorter leg of the letter joins the longer leg, as designated by reference numeral 24 in FIGS. 6 and 7, the width of the oblique face between the uppermost ridge 23 and the internal edge 21 decreases. In this configuration, referring to FIG. 3, the corresponding portion of the second guide 22, at the position indicated by reference numeral 25 is closer to the inside vertical face at the position designated by reference numeral 26. Thus the positioning of the second guide 22 relative to the vertical faces of the outlined piece 18 will determine the cutting angle and thus the final appearance of the letter to be formed. Depending upon the style, size and shape of the end product, the configuration and position of the second guide 22 may be designed to produce the desired end product. Similarly, the position of the upper edges 19 of the side 17 of the jig 15 may be varied relative to the lower corner 20 of the silhouetted piece 18 to vary the shape of the final product.

Referring to FIG. 4, once the upper guide 22 is secured in position on the upper surface of the outlined piece 18, a heated wire W may be guided by means of a hand-held guide 27 through the thermoplastic material with the wire in contact with the upper edges 19 of the side 17 of the jig 15 and the second guide 22. Cutting in this manner may be done to form the final shaped product shown in FIGS. 6 and 7.

FIG. 5 illustrates the manner in which the upper terminal portion of the letter may be fabricated, using a special device to guide the cutting wire W around the terminal portion of the second guide 22. (In this figure, the portions being cut-away have been removed.) Secured to the terminal portion of the second guide 22 is a small disc 28 which rotates about an axis normal to the plane of the upper surface of the outlined piece 18. A radially extending slot 29 in the disc receives the wire W as it moves along the guide wire 22 and upper edge 19 of the side 17 in the direction shown by the large arrow. When the wire W has reached the approximate position shown in FIG. 5, it is received by the slot 29 and continued movement around the curved upper edge 19 will cause the disc 28 to pivot on its axis, as shown by the small arrow, and thus guide the wire W around to the other side of the guide 22 at which point it starts its return movement down the other side of the figure. The use of such a mechanism in forming the terminal portion as illustrated is necessary in that it is important that the wire W, as it moves along the guide 22 and upper surface 19 of the side 17, is at a constant speed. If the oeprator pauses with the wire in one position for any length of time, in order to adjust his position on the guides, etc., heat from the wire will thermally collapse adjacent portions of the thermoplastic material and thus the final prepared surface will have an indentation or grooved portion which will impair the final appearance of the letter being formed.

Referring to FIG. 6, the final object in this illustration is a letter having a silhouetted outline formed by side faces normal to the bottom surface and a pair of intersecting oblique or angled faces whose intersections form the upper ridge 23. Because the prepositioned guides 22 and 19 have been used, and the silhouette 18 has been determined by the shape of the guide member 10, a series if identical letters may be produced by an inexperienced operator who must only insure that the cutting by the wire in FIG. 1 is done at a relatively constant speed by guiding the wire W along the edges of the guide 10 and, in like manner, cutting with the hand-held wire W, as shown in FIG. 4, guided along the guides 22 and 19.

After the final cutting operation, the exposed surfaces of the letter may be lightly sanded to remove any large surface irregularities or areas where the exposed thermoplastic cells have been collapsed due to excessive heat. If such finishing operation is unnecessary, the letter is ready for final preparation by coating with a viscous material which fills the surface irregularities or pores of the material to present a smooth, glossy surface. Several commercially available coating materials are satisfactory for this purpose. These materials may contain a solvent which dissolves exposed surface portions of the letter for a slight depth, thus presenting an extremely smooth surface for the final painting. After the surface has been coated and smoothed, the letter may be painted with an appropriate color which contrasts with the background material upon which the letter or letters are to be displayed.

FIGS. 7 and 8 illustrate one method of attaching the letters to a generaly planar and vertical surface. Because these letters of foamed thermoplastic material are relatively light in weight, as contrasted to wooden or ceramic letters, they may be conveniently adhered to a metallic background by the use of magnetic rubber strips cemented to the rear surface of the letter. Because outdoor billboards are commonly made of sheet metal, such as galvanized steel, the magnetic strips which have been adhesively secured to the rear face of the formed letter and which are designated by reference numeral 30 in FIGS. 7 and 8, readily adhere to the billboard surface, designated by reference numeral 31.

An alternate method of securing the letters to a metallic billboard is to secure, by means of adhesive, tacks or staples, strips of galvanized steel or other ferromagnetic metal to the rear surface of the letter. After this has been done, the magnetic strips 30 may be used as before but without adhesive directly thereon so that they are positioned between the metallic billboard 31 and the metallic strips secured to the rear face of the letter. This method, provides superior adhesion between the billboard and the letter.

It will be seen that the method described herein provides a means for fabricating a large number of identically shaped advertising letters or figures which, because of their light weight, can be easily secured or posted upon a billboard by a single worker. The magnetic strips 30, when adhesively secured to the rear face of the letter, provide sufficient force to hold the letter 30 in position on the billboard backing 31 to prevent unintended movement by wind and other vibrations, etc. but yet to permit easy adjustment by the person posting the board.

It will be apparent that various changes and modifications can be made in the specific details discussed above and described in the examples, without departing from the spirit and scope of the attached claims.

I claim:
1. A method of fabricating three dimensional shaped objects of thermoplastic material, said objects having predetermined outlines defined by side surfaces normal to planar rear surfaces and each having at least one oblique surface at an acute angle to said side and rear surfaces, comprising the steps of:
 (a) shaping a blank conforming to said predetermined outline defined by said normal side surfaces from a piece of said thermoplastic material having parallel and spaced front and rear faces,
 (b) placing said blank in a shaped lower jig corresponding to said predetermined outline and having a lower guide member extending contiguously along said side surfaces and lying in a plane parallel to and spaced a predetermined distance from said back surface of said blank,
 (c) positioning a shaped upper guide member upon said front face of said blank at a predetermined distance from said side surfaces,
 (d) guiding a forming tool along said lower and upper guide members for forming said oblique surface,
 (e) and removing material above said oblique surface from the remainder of said blank.

2. A method of fabricating a three dimensional object of foamed thermoplastic materials, said objects having a predetermined outline defined by side surfaces normal to a planar rear surface and at least one oblique face at an acute angle to said side and rear surfaces, comprising the steps of:
 (a) shaping a blank conforming to said predetermined outline defined by said side surfaces from a piece of said foamed thermoplastic material having spaced apart parallel front and rear faces by passing a forming instrument normal to said front and rear faces along said predetermined outline,
 (b) placing said blank in a shaped jig corresponding to said predetermined outline and having a first guide member adjacent said side surfaces parallel to said rear surface and at a predetermined distance therefrom,
 (c) positioning a shaped upper guide member upon said front face of said blank at a predetermined distance from said side surfaces,
 (d) passing a linear forming instrument along said lower and upper guide members throughout said blank to form said oblique faces,
 (e) and removing the material above said oblique faces from the remainder of said blank.

3. The method of claim 2 wherein said forming instrument is a straight wire heated to a temperature in excess of the melting point of such thermoplastic material whereby said wire melts and separates a small area of such material as it is passed therethrough.

4. The method of claim 2 which further includes the step of:
 (f) coating the side, oblique and front surfaces of said blank with a liquid coating material to substantially fill and mask surface irregularities thereon.

References Cited

UNITED STATES PATENTS

| | | | |
|---|---|---|---|
| 2,122,261 | 6/1938 | Morris | 83—565 |
| 2,677,747 | 5/1954 | Jaye | 264—163 X |
| 2,692,328 | 10/1954 | Jaye | 264—138 X |
| 2,805,692 | 10/1957 | Thompson | 144—144 |
| 2,990,861 | 7/1961 | Macks et al. | 144—134 X |
| 3,191,500 | 6/1965 | Schuster | 144—124 X |

ROBERT F. WHITE, *Primary Examiner.*

S. I. LANDSMAN, *Assistant Examiner.*